United States Patent [19]

Oka

[11] Patent Number: 4,504,916
[45] Date of Patent: Mar. 12, 1985

[54] ABNORMAL FLOW DETECTING CIRCUIT IN PAPER SHEET COUNTING MACHINE

[75] Inventor: Yoshinobu Oka, Tokyo, Japan

[73] Assignee: Laurel Bank Machine Co., Ltd., Tokyo, Japan

[21] Appl. No.: 376,033

[22] Filed: May 7, 1982

[30] Foreign Application Priority Data

May 8, 1981 [JP] Japan ............................ 56-66373[U]
May 9, 1981 [JP] Japan ............................ 56-66825[U]

[51] Int. Cl.$^3$ ............................................. G06F 15/46
[52] U.S. Cl. .................................... 364/471; 364/562; 377/8; 355/14 C; 355/14 SH
[58] Field of Search ............. 377/8; 355/14 C, 14 SH; 364/471, 562

[56] References Cited

U.S. PATENT DOCUMENTS

| | | | |
|---|---|---|---|
| 3,870,868 | 3/1975 | Jones | 377/8 |
| 3,916,171 | 10/1975 | Throp | 377/8 |
| 4,026,543 | 5/1977 | Leclere | 377/8 |
| 4,076,408 | 2/1978 | Reid et al. | 355/14 SH |
| 4,211,482 | 7/1980 | Arai et al. | 355/14 C |
| 4,255,651 | 3/1981 | Phillips | 377/8 |
| 4,273,439 | 6/1981 | Markham et al. | 355/14 C |

Primary Examiner—Jerry Smith
Assistant Examiner—Louis Woo
Attorney, Agent, or Firm—Fleit, Jacobson, Cohn & Price

[57] ABSTRACT

A paper sheet counting machine for feeding paper sheets, one at a time, and counting the number of the paper sheets, includes a circuit for detecting an abnormal flow of the paper sheets. In the circuit, the lengths of paper sheets are detected. A predetermined number of the detected signals are averaged. The newest length value is compared with the averaged value to provide a difference signal which determines whether an abnormal flow of the paper sheet has occurred. The averaged value is renewed to compensate for deviation of the length values.

7 Claims, 6 Drawing Figures

F I G. 1
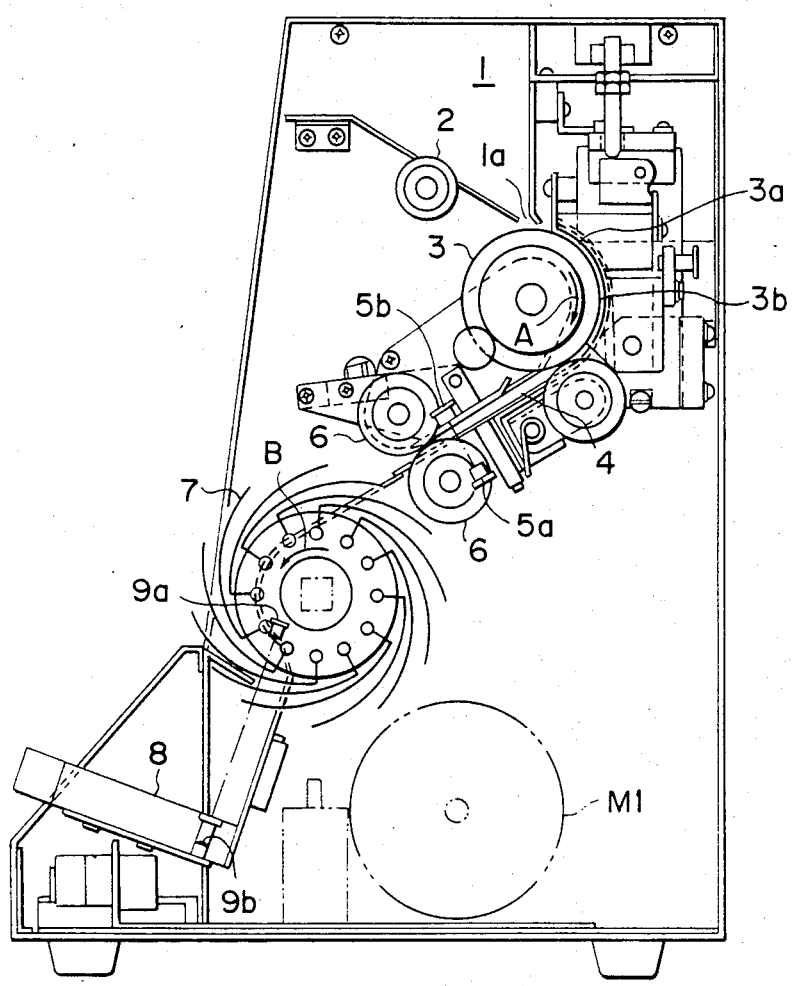

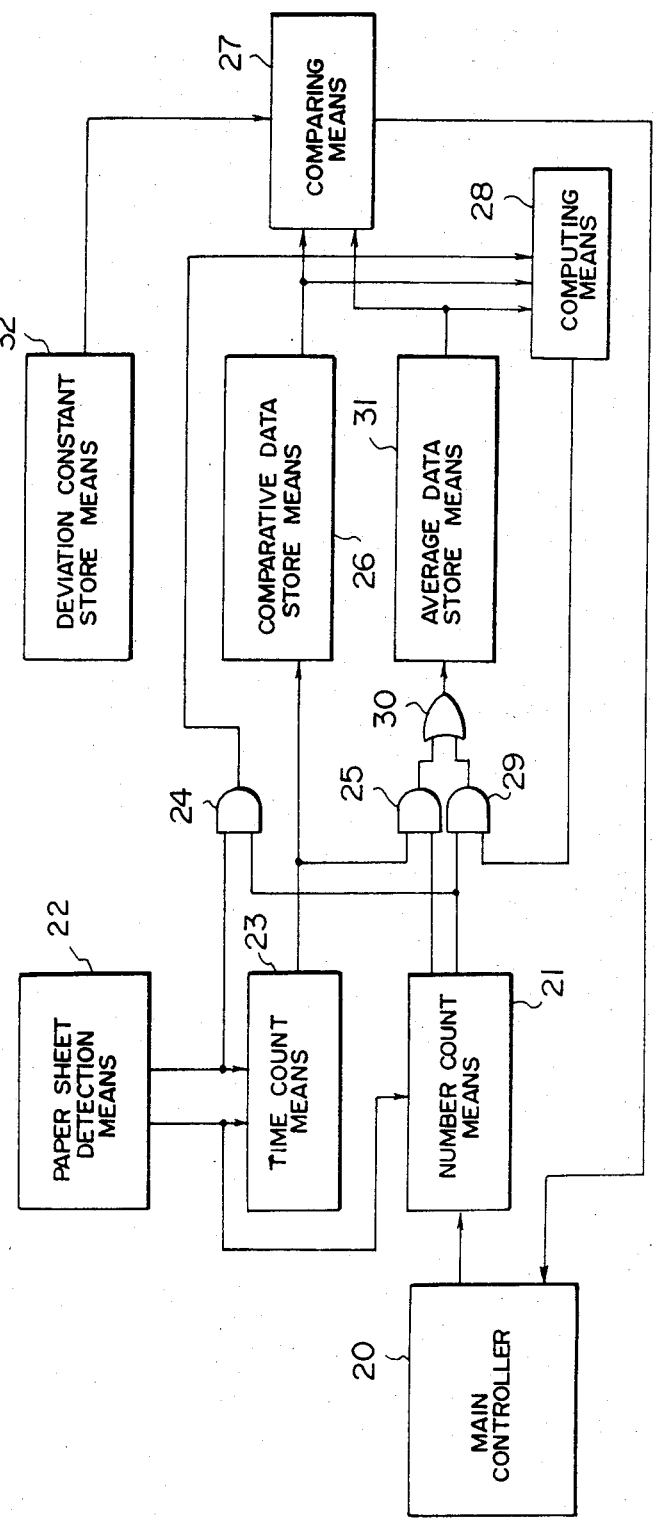
F I G. 4

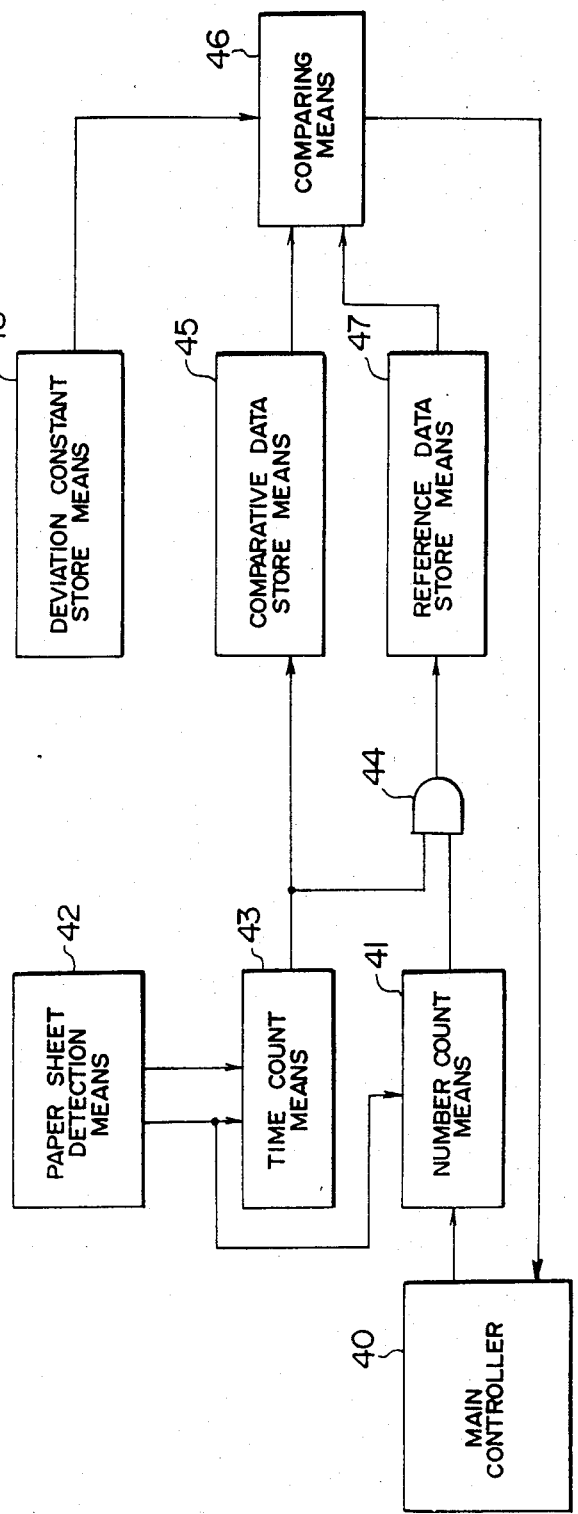

ABNORMAL FLOW DETECTING CIRCUIT IN PAPER SHEET COUNTING MACHINE

BACKGROUND OF THE INVENTION

The present invention relates to an abnormal flow detecting circuit in a paper sheet counting machine, which is operable even if the kind of paper sheets is changed or the paper sheet delivery speed is changed because of a change of the load or the like. The abnormal flow detecting processing is subsequently automatically changed over to one suitable for the new kind of paper sheets or the new delivery speed.

There are various known paper sheet counting or money counting machines used for the bank business or the like and other various machines for counting voting cards and the like. Each of these known paper sheet counting machines is constructed so that paper sheets thrown into the counting machine are drawn out one by one by a paper sheet draw-out device and fed into a paper sheet delivery device. The number of paper sheets fed into the paper sheet delivery device is counted to determine the number of the paper sheets thrown into the counting machine. In such a paper sheet counting machine, it is very difficult to insure the separation of paper sheets one by one from the paper sheets thrown into the counting machine. Accordingly, in the conventional paper sheet counting machine, there is disposed on abnormal flow detecting circuit in the delivery passage through which a paper sheet is separated from and drawn out from the charged paper sheets travels or hopper. A passage detector is disposed to detect the passage time of the paper sheet, and the length or width of each paper sheet passing through the delivery passage is measured based on the result of detection of the passage detector. Thereafter, it is determined, based on the obtained length or width data, whether the paper sheet, the passage of which is detected by the passage detector, is a normal sheet or an assembly comprising two or more of sheets delivered together in the chain-like form or the like form. In such an abnormal flow detecting circuit disposed in the paper sheet counting machine, however, every time the kind of paper sheets to be thrown in the paper sheet counting machine is changed, it is necessary to change data of the reference length in a comparator for comparing the length data obtained based on the passage detection signal put out by the passage detector (the length of the period during which the passage detection signal is put out) with the predetermined reference length data (which is ordinarily set by a timer or the like).

In the conventional abnormal flow detecting circuit, the change of the reference length data to be supplied to the comparator is directly performed by an operator, and therefore, when the kind of paper sheets to be thrown in the paper sheet counting machine is changed, the operator makes many operations and it often happens that the charged paper sheets are not properly counted because of the operator's mistake in the input operation. Furthermore, it is necessary to perform a troublesome operation of measuring in advance the length of paper sheets to be thrown into the counting machine and obtaining necessary length data.

In the conventional paper sheet counting machine, if large quantities of paper sheets are charged in a hopper zone arranged in the counting machine, the load on the paper sheet draw-out device or paper delivery device is increased because of the weight of the paper sheets, and therefore, a slip is readily caused among rollers or pulleys or between the rollers or pulleys and belts trained thereon or the rotation speed of a motor for driving these rollers is reduced due to the increased weight. In such case, since the speed of delivery of paper sheets charged in the hopper zone of the paper sheet counting machine is gradually changed by the above-mentioned influences of the weight of the paper sheets, the length data obtained based on the length of the passage detection signal put out from the passage detector mounted on the delivery passage becomes inaccurate, with the result that the abnormal flow detecting circuit arranged in the paper sheet counting machine operates in an erroneous manner.

SUMMARY OF THE INVENTION

It is, therefore, an object of the present invention to provide an abnormal flow detecting circuit in a paper sheet counting machine, in which even if the kind of paper sheets to be thrown into the counting machine is changed, the reference length data corresponding to the new kind of paper are automatically set, whereby the operations required by an operator are reduced and simplified, and the occurrence of troubles due to an erroneous input operation by the operator can be prevented, and measurement of the length of paper sheets to be thrown into the counting machine is unnecessary.

It is another object of the present invention to provide an abnormal flow detecting circuit in a paper sheet counting machine, in which even if the paper sheet delivery speed is changed because of variations of the load and the like, the reference length data are automatically set according to the change of the delivery speed, whereby erroneous operation due to changes of the load and the like is prevented.

In accordance with the present invention, there is provided a circuit for detecting abnormal flows in a paper sheet counting machine in which sheets of paper are drawn out one by one and are counted and a predetermined processing is carried out based on the obtained sheet number data. The detecting circuit includes a length detecting means for detecting the length of a paper sheet when it passes through a predetermined position of a paper sheet passage, memory means for storing predetermined data obtained based on the length data obtained by said length detecting means, computing means for obtaining new predetermined data based on the predetermined data obtained by said memory means and the length data obtained by said length detecting means when the paper sheet passes through said predetermined position and making the so-obtained new data stored in said memory means as the predetermined data, and judging means for determining whether or not the paper sheet, the length of which is detected by said length detecting means, has been normally drawn out, based on the predetermined data stored in said memory means and the data obtained by said length detecting means every time the paper sheet passes through the length detecting means, wherein an abnormal flow of paper sheets is detected based on the result of discrimination made by said judging means.

In accordance with the present invention, there is also provided a circuit for detecting abnormal flows in a paper sheet counting machine in which sheets of paper are drawn out one by one and are counted and a predetermined processing is carried out based on the obtained sheet number data. The detecting circuit includes a length detecting means for detecting the length of a paper sheet when it passes through a predetermined position of a paper sheet passage, memory means for receiving in a predetermined period and for storing length data obtained by said length detecting means, and judging means for determining whether or not the paper sheet, the length of which is detected by said length detecting means, has been normally drawn out, based on the length data stored in said memory means and the length data obtained by said length detecting means every time the paper sheet passes through the predetermined position, wherein an abnormal flow of paper sheets is detected based on the result of discrimination made by said judging means.

DESCRIPTION OF THE DRAWINGS

The present invention will now be described in detail by reference to embodiments illustrated in the accompanying drawings in which:

FIG. 1 is a schematic sectional view illustrating a paper sheet counting machine in which the circuit of the present invention is provided;

FIG. 4 is a block diagram showing another circuit of the first embodiment according to the present invention;

FIG. 6 is a block diagram showing another circuit of the second embodiment according to the present invention.

DESCRIPTION OF THE PREFERRED EMBODIMENTS

Figure 2:
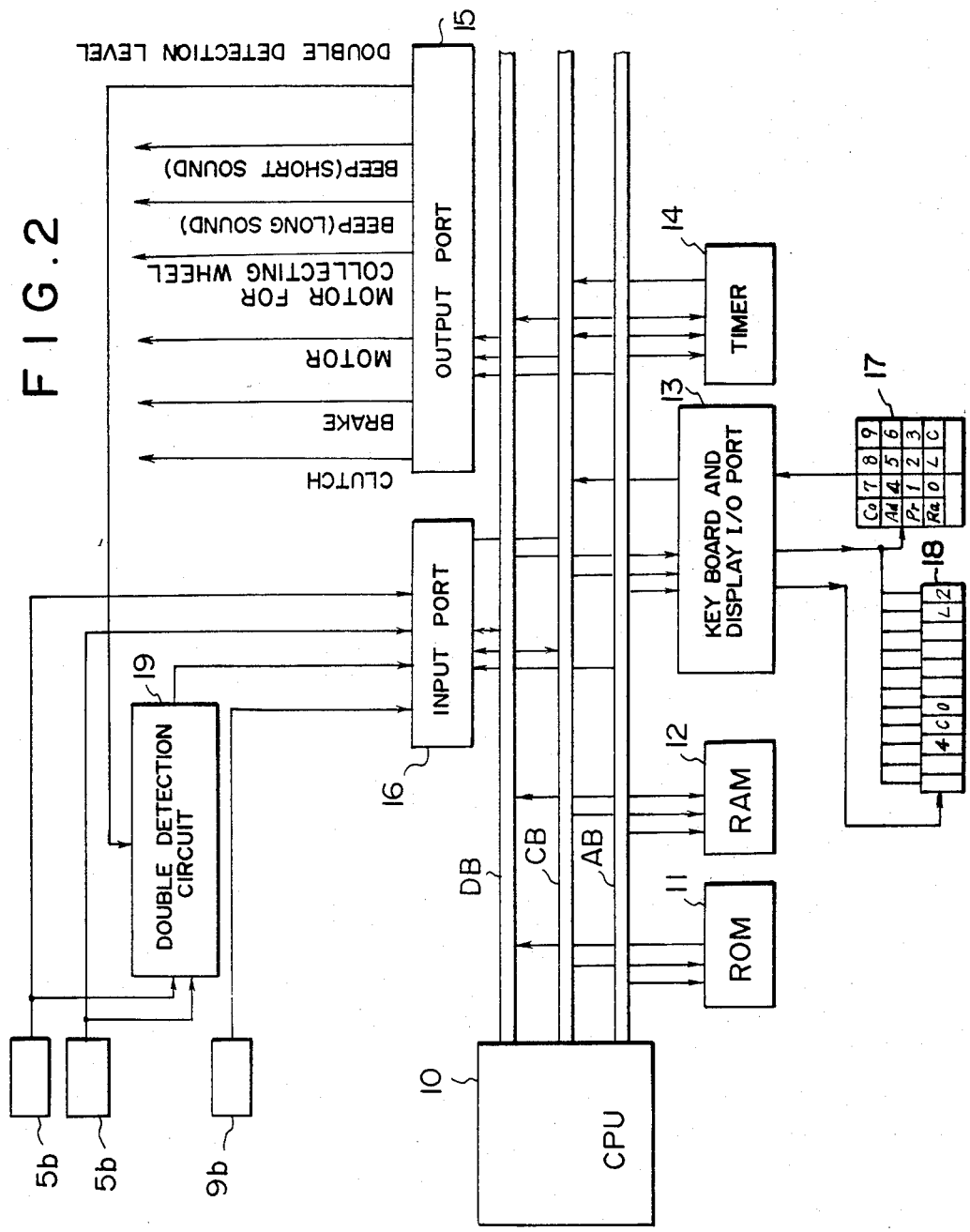
FIG. 2 is a block diagram showing a first embodiment according to the present invention in which the circuit is constructed by using a CPU system.

Embodiments of the present invention will be now described in detail with reference to the accompanying drawings.

FIG. 1 is a schematic sectional view illustrating a paper sheet counting machine in which the circuit of the present invention is provided. In FIG. 1, reference numeral 1 represents a hopper in which a large number of paper sheets are accumulated. Paper sheets accumulated in this hopper 1 are passed through a slit 1a one by one by a guide roller 2 and fed to a delivery roller 3. The delivery roller 3 is rotated in the direction of arrow A by a counting motor M1. There is a clutch (not shown) arranged for transmitting the rotation to the delivery roller 3 from the counting motor M1 and a brake (not shown) for stopping the delivery roller 3 abruptly. Frictional members 3a and 3b are provided opposite to the delivery roller 3 so that the differential frictional force between the delivery roller 3 and the frictional members 3a and 3b, forces paper sheets, accumulated in the hopper 1, to be intermittently supplied one by one to a delivery passage 4. Light projectors and receivers 5a and 5b for counting the number of paper sheets are arranged so that they are opposed to each other and the delivery passage 4 is interposed therebetween. The passage of the paper sheet which is delivered along the delivery passage 4 is detected by the light projectors and receivers 5a and 5b. The paper sheet is then fed to an accelerating roller 6. The accelerating roller 6 is driven and rotated by the counting motor M1, and the paper sheet is gripped by the accelerating roller 6. The paper sheet is then thrown into a collecting wheel 7 at an increased speed. This collecting wheel 7 is driven and rotated in the direction of arrow B by an accumulating motor (not shown). Accordingly, paper sheets supplied at the increased speed are accumulated one by one in good order on a sheet receiving stand 8 by the collecting wheel 7. The presence or absence of the paper sheets on the sheet receiving stand 8 is detected by residual sheet detecting light projector and receiver 9a and 9b.

Although not shown in FIG. 1, on the right side of the front of the paper sheet counting machine, there is disposed input means 17 described hereinafter, which comprises a count button, and add button, a present button, a repeat button, a start button, a stop button, a ten key, a write button and a clear button, etc. Above the input means, there is disposed display means 18 described hereinafter, which comprises a counted number display device, a device for displaying an accumulated total sheet number or preset sheet number every time the mode is changed and a light quantity setting display device. Incidentally, each of these display devices consists of a 7-segment type LED, LCD or plasma display device or a dot-matrix type display device such as CRT.

Figure 3:
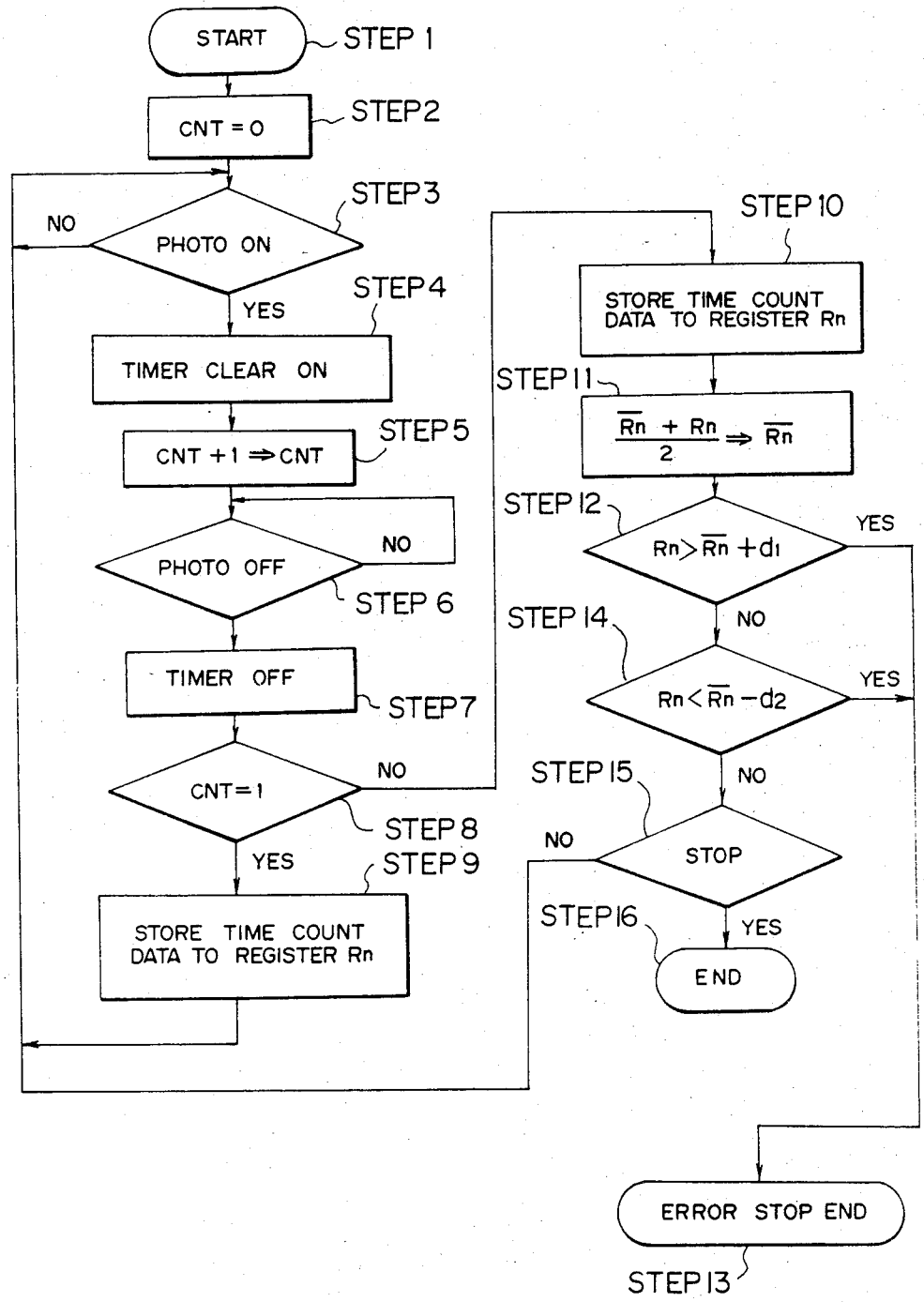
FIG. 3 is a flow chart illustrating the first embodiment shown in FIG. 2.

FIG. 2 is a block diagram showing an embodiment in which the circuit of the present invention is constructed by using a CPU system, and FIG. 3 is a flow chart illustrating the embodiment of FIG. 2. In FIG. 2, CPU 10 performs operations according to programs described hereinafter, and CPU 10 is connected to ROM 11, RAM 12, a key board and display I/O port 13, a timer 14, an output port 15 and an input port 16 through an address bus AB, a data bus DB and a control bus CB.

When one of buttons of the input means 17, arranged in the right lower portion of the front panel of the paper sheet counting machine shown in FIG. 1, is depressed, the key board and display I/O port 13 generates a signal corresponding to each of the depressed button and emits this signal to CPU 10. On the other hand, the key board and display I/O port temporarily stores therein various display data supplied from CPU 10, decodes these data and subsequentially emits them to the display means 18 to effect the display. Incidentally, the display of the counted number or the like shown by the display means is zero-suppressed so that the display can be seen easily.

When a time count starting signal is supplied to the timer 14 from CPU 10, the time count data presently stored therein are erased and the time count operation is started by the timer 14. When the time count, completion signal is supplied to the timer 14 from CPU 10, the time count operation is terminated and the timer 14 stores therein the thus obtained time count data and supplies these data to CPU 10. Incidentally, when the time count starting signal is supplied to the timer 14 from CPU 10, the timer 14 performs the time count operation in parallel to the abovementioned operation, and when a predetermined time has passed from the start of the time count operation, the timer 14 supplies an interrupt signal to CPU 10 to inform CPU 10 of interruption of supply of the time count starting signal during a certain period.

Based on respective control signals supplied from CPU 10, the output port 15 supplies a counting motor driving signal to the counting motor M1 for driving the guide roller 2, delivery roller 3 and accelerating roller 6, a collecting wheel motor driving signal to the collecting wheel motor for driving the collecting wheel 7; a clutch exciting solenoid driving signal to a clutch exciting solenoid for actuating (or de-energizing) a clutch arranged coaxially with the guide roller 2 to transmit the driving force generated by the counting motor to the guide roller 2 and delivery roller 3; a brake exciting solenoid driving signal to a brake exciting solenoid for actuating a brake mechanism arranged coaxially with the delivery roller 3 to stop the delivery roller 3 and guide roller 2; a long sound generating signal to a long buzzer sound generating circuit in the paper sheet counting machine; and a short sound generating signal to a short buzzer sound generating circuit arranged in the paper sheet counting machine, respectively. Furthermore, the output port 15 supplies double detection level data to a double detection circuit 19. When a signal for starting the driving of the counting motor M1 is supplied to the output port 15 from CPU 10, the output port 15 supplies a counting motor driving signal to the counting motor M1 to actuate the counting motor M1 and drive and rotate the accelerating roller 6. In this case, if the clutch exciting solenoid is actuated, the guide roller 2 and delivery roller 3 are simultaneously driven and rotated together with the accelerating roller 6. When a signal for starting the driving of the collecting wheel is supplied to the output port 15 from CPU 10, the output port 15 supplies that signal to the collecting wheel motor to actuate and rotate the collecting wheel 7. Furthermore, the output port 15 supplies, a clutch exciting solenoid driving signal to the clutch exciting solenoid from CPU 10 to actuate the solenoid and to excite the clutch. In the case where the counting motor M1 generates the driving force, and when the clutch is thus excited, the driving force is transmitted to the guide roller 2 and delivery roller 3. Moreover, when a signal for starting the driving of the brake is supplied to the output port 15 from CPU 10, the brake exciting solenoid signal actuates the solenoid to excite the brake and to actuate the brake, whereby the delivery roller 3 and guide roller 2 are braked and stopped. Still further, when a signal for starting the generation of a long sound is supplied to the output port 15 from CPU 10, the long sound generating signal is applied to a buzzer circuit to generate a long buzzer sound. When a signal for starting the generation of a short sound is supplied to the output port 15 from CPU 10, a short sound generating signal is applied to a buzzer circuit to generate a short buzzer sound. When double detection level data are supplied to the output port 15 from CPU 10, the output port 15 supplies the supplied double detection level data (double detection level data obtained by decoding the supplied double detection level data) to the double detection circuit 19.

The double detection circuit 19 compares the signal of the quantity of light received by the light receivers 5b with the reference signal of the light quantity corresponding to one paper sheet and judges whether or not two or more of paper sheets are delivered in the lapped states. The double detection circuit 19 comprises a DA converter for converting the double detection level data to corresponding analog data (reference transmitted light quantity signal) and a comparator for comparing the reference transmitted light quantity signal obtained from the DA converter with the transmitted light quantity signal supplied from the light receivers 5b. When the transmitted light quantity signal supplied from the light receivers 5b is smaller than the reference transmitted light quantity signal, the double detection circuit 19 generates a double feed detecting signal and supplies this signal to the input port 16.

When the double feed detecting signal is supplied to the input port 16 from the double detection circuit 19, the input port 16 generates an interrupt signal and supplies this signal to CPU 10 to inform CPU 10 of feeding of two or more of lapped paper sheets. Furthermore, when the transmitted light quantity signal supplied from the light receiver 5b is smaller than a predetermined value (this value is set at a level slightly smaller than the transmitted light quantity signal put out by the light receiver 5b when the light reaching the light receiver 5b is not intercepted by the paper sheet at all), the input port 16 supplies a passage detection starting signal to CPU 10. When the transmitted light quantity signal from the light receiver 5b becomes larger than the predetermined value, the input port 16 supplies a passage detection terminating signal to CPU 10. Furthermore, when the other input, that is, the transmitted light quantity signal from the light receiver 9b for detecting the presence or absence of a paper sheet on the paper sheet receiving stand 8, is smaller than a predetermined value, the input port 16 supplies a paper sheet detecting signal to CPU 10.

ROM 11 stores therein programs based on a flow chart described hereinafter, and RAM 12 is an operation region for the programs stored in ROM 11. Incidentally, allowable error data d1 and d2 are stored in RAM 12 in advance.

In the paper sheet counting machine having the above-mentioned structure, when an operator turns on a power source switch (not shown) of the paper sheet counting machine, sets paper sheets to be counted in the hopper 1 and depresses the start button of the input means (step 1 in FIG. 3), the key board and I/O port 13 generates a start signal corresponding to the depressed start button, whereby CPU 10 is actuated and each section starts its operation. More specifically, when the start button of the input means 17 is depressed, CPU 10 first supplies a signal for starting the driving of the counting motor and a signal for starting the driving of the collecting wheel motor to the output port 15, whereby the counting motor and the collecting wheel motor are rotated to drive and rotate the accelerating roller 6 and the collecting wheel 7. Then, CPU 10 supplies predetermined double detection level data (double detection level data newly put in from the write button and ten key of the input means 17) and a signal for starting the driving of the clutch to the output port 15. Consequently, the double detection circuit is actuated to establish the state where detection of the double feeding becomes possible. Simultaneously, the guide roller 2 and delivery roller 3 are rotated in the direction of arrow A to draw out the paper sheets charged in the hopper 1 one by one to the delivery passage.

Simultaneously with the foregoing operations, CPU 10 erases a preset count number in a register in CPU 10 (the counted paper sheet number is stored in this register) (step 2 in FIG. 3) and performs initial setting of the counting operation. When paper sheets begin to pass between the light projectors and receivers 5a and 5b, arranged opposite to each other with the delivery passage 4 being interposed therebetween, the quantity of light arriving at the light receivers 5b is reduced, with the result that the signal put out from the light receivers 5b is reduced. Accordingly, the double detection circuit 19 judges the level of the transmitted light quantity signal from the light receivers 5b based on the double detection level data supplied from the output port 15, and when double feeding is detected, the double detection circuit 19 supplies a double feeding detection signal to the input port 16. When the double feeding detection signal is supplied to the input port 16 from the double detection circuit 19, the input port 16 performs a predetermined processing such as interruption into CPU 10, and based on reduction of the voltage of the transmitted light quantity signal from the light receivers 5b, the input port 16 generates a passage detection starting signal and supplies this signal to CPU 10. On receipt of the passage detection starting signal from the input port 16 (step 3 in FIG. 3), CPU 10 generates a time count starting signal and supplies this signal to the timer 14. On receipt of the time count starting signal from CPU 10, the timer 14 erases the stored time count data of the previous cycle (the time count data of the previous cycle are zero data or indefinite data) and starts the time counting operation (step 4 in FIG. 3). Then, CPU 10 reads the count data stored in the initially set register (in this case, the count data which have been stored are erased by initial setting) and adds "1" to the read count data, and CPU 10 stores the resulting count data in the count register (step 5 in FIG. 3). When the paper sheet passes between the light projectors and receivers 5a and 5b and through in the delivery passage 4, the level of the transmitted light quantity signal put out from the light receivers 5b is elevated and the input port 16 supplies a passage detection termination signal to CPU 10. On receipt of the passage detection termination signal from the input port 16 (step 6 in FIG. 3), CPU 10 generates a time count termination signal and supplies this signal to the timer 14. On receipt of this signal, the timer 14 terminates the time counting operation which has been continued (step 7 in FIG. 3). Simultaneously, the timer 14 supplies the obtained time count data to CPU 10. CPU 10 reads and stores the time count data supplied from the timer 14, and simultaneously, CPU 10 reads out the count data stored in the count register and judges whether or not the count data thus read out indicate "1" (step 8 in FIG. 3). When the data read out indicate "1", the stored time count data (the data are used as the predetermined data) are stored in a register having a predetermined address in RAM 12 (this register will be referred to as "$\overline{Rn}$" hereinafter) by CPU 10 (step 9 in FIG. 3). When the subsequent paper sheet is delivered to delivery passage 4 and starts to pass through between the light projectors and receivers 5a and 5b, the level of the transmitted light quantity signal put out by the light receiver 5b is reduced, and CPU 10 repeats the above-mentioned operations (steps 3 through 7 in FIG. 3). Then, CPU 10 reads out the count data stored in the count register and judges whether or not the count data thus read out indicate "1" (step 8 in FIG. 3). Since the count data read out do not indicate "1", the time count data from the timer 14, which are stored at this time (the data are used as the paper sheet length data), are stored in a register of a predetermined address (hereinafter referred to as "Rn") in RAM 12 by CPU 10 (step 10 in FIG. 3). Then, CPU 10 or computing means reads the predetermined data stored in the register $\overline{Rn}$ of RAM 12 and the length data stored in the register Rn of RAM 12 and adds the read predetermined data and length data to each other. Then, CPU 10 divides the obtained addition data by 2 and stores the obtained operational data as new predetermined data in the register $\overline{Rn}$ of RAM 12 (step 11 in FIG. 3). The original predetermined data corresponds to the length of one paper sheet whereas the new predetermined data now corresponds to the average length data. When the new predetermined data are stored in the register $\overline{Rn}$ of RAM 12, the register $\overline{Rn}$ of RAM 12 has already been cleared. In other words, the CPU incorporates a renewal means to change the new predetermined or average length data. Then, CPU 10 reads the allowable error data d1 stored in RAM 12 and the predetermined data stored in the register $\overline{Rn}$ of RAM 12 and adds both the data, and thereafter CPU 10 stores the obtained upper limit length data. Then, CPU 10 reads the length data stored in the register Rn of RAM 12 and compares the read length data with the upper limit length data (step 12 in FIG. 3). In the case where the read length data are larger than the upper limit length data, that is, in the case where chained flow or overlap of paper sheets is noted, a predetermined error stop processing operation occurs, for example, a signal for stopping the driving of the clutch, a signal for starting the driving of the brake and the like is sent to the output port 15 by the CPU to stop the respective members, and simultaneously, an error display signal is supplied to the key board and display I/O port 13 causes the display means to indicate the occurrence of an error (step 13 in FIG. 3). In the above-mentioned case, if the read length data are equal to or smaller than the stored upper limit length data, CPU 10 reads the allowable error data d2 stored in RAM 12 and the predetermined data stored in the register $\overline{Rn}$ of RAM 12, subtracts the allowable error data d2 from the read predetermined data and stores the obtained lower limit length data. Then, CPU 10 reads the length data stored in the register Rn of RAM 12 and compares the read length data with the stored lower limit length data (step 14 in FIG. 3). In the case where the read length date are smaller than the stored lower limit length data, namely if a broken paper piece (broken note) is detected, the above-mentioned predetermined error stop processing operation is performed (step 13 in FIG. 3). On the contrary, in the case where the read length data are equal to or larger than the stored lower limit length data, CPU 10 judges whether or not the key board and display I/O port 13 puts out a stop signal (step 15 in FIG. 3). In other words, the CPU and various other components compare the read length or newest length data to the new predetermined length data (or average length data) to generate a difference signal. In this view the difference signal must be greater than or less than d1 or d2, respectively, to actuate the termination operation by the CPU as noted in the flow chart of FIG. 3. Therefore, the CPU includes a comparing means and a judging means to compare the read length data to the average length data and to determine whether an abnormal flow of paper sheets has occurred within the device. In the case where the key board and display I/O port 13 puts out a stop signal, namely when the operator depresses the stop button of the input means 17, CPU 10 puts out signals for the termination of the counting operation, for example, a signal for stopping the driving of the counting motor, a signal for stopping the driving of the collecting wheel motor and the like are supplied to the output port to stop the respective members (step 16 in FIG. 3). On the contrary, when the key board and display I/O port 13 does not put out a stop signal, CPU 10 repeats the above-mentioned operations (steps 3 through 8 and 10 through 15 in FIG. 3). Incidentally, in the case where CPU 10 is standing by at the step 3, if the timer 14 puts out an interrupt signal, CPU 10 begins the processing operation necessary for termination of the counting operation.

In the foregoing embodiment, the allowable error data d1 and d2 are stored in RAM 12 in advance. Of course, there may be adopted a modification in which allowable errors of respective paper sheets are obtained, the obtained allowable errors are shown in the display means 18 during or after the counting operation and the operator subsequently inputs the shown allowable error data in RAM 12 or inputs an allowable error data in RAM 12 based on the maximum allowable error data or a predetermined allowable error data. Moreover, these allowable error data may be stored in ROM 11 although these data are stored in RAM 12 in the foregoing embodiment.

In the foregoing embodiment, since the double detection circuit 19 is utilized with the present invention, the detection of double feeding can be performed simultaneously with the above-mentioned length detection, and therefore, the precision of the counting operation can be increased.

FIG. 4 is a block diagram showing the circuit structure of another embodiment of the first embodiment. Referring to FIG. 4, when the start button of the input means 17, mounted on the front panel of the paper sheet counting machine shown in FIG. 1, is depressed, a main controller 20, for controlling the respective members, generates a count start signal and supplies this signal to number count means 21. Paper sheet detecting means 22 comprises light projectors and receivers 5a and 5b shown in FIG. 1, and when a paper sheet is delivered through the delivery passage 4 and begins to pass between the light projectors and receivers 5a and 5b, arranged in the delivery passage 4, the paper sheet detecting means 22 supplies a passage detection starting signal to the number count means 21 and time count means 23. When the paper sheet passes through the delivery passage 4 and between the light projectors and receivers 5a and 5b in this state, the paper sheet detecting means 22 supplies a passage detection termination signal to a first input terminal of an AND gate 24 and the time count means 23. The time count means 23 includes a retrigger type timer. When the passage detection starting signal is supplied to the time count means 23 from the paper sheet detecting means 22, this timer of the time count member 23 is reset to start the time counting operation, and when the passage detection termination signal is supplied to the time count means 23 from the paper sheet detecting means 22 in this state, the time counting operation is terminated and the time count means 23 supplies the obtained time count data to a data input terminal of an AND gate 25 and comparative data store means 26. Every time the passage detection starting signal is supplied from the paper sheet detecting means 22, the time count means 23 repeats the above-mentioned operation. The comparative data store means 26 comprises a register or a data latch circuit, and the comparative data store means 26 stores the time count data supplied from the time count means 23 until the subsequent time count data are supplied. Simultaneously, the comparative data store means 26 supplies the stored time count data to comparing means 27 and computing means 28.

The number count means 21 comprises a counter which is actuated when a number count starting signal is supplied from the main controller 20. The number count means 21 counts the number of passage detection starting signals supplied from the paper sheet detecting means 22 and supplies the obtained number count data to display means (not shown). When the number count data indicate "1", the number count means 21 supplies a gate opening signal to a control input terminal of the AND gate, and when the number count data indicates "2 or more", the number count means 21 supplies a gate opening terminal to a second input terminal of the AND gate 25 and a control input terminal of an AND gate 29. When the gate opening signal is supplied to the control input terminal of the AND gate 25, the gate 25 is opened. When the time count data are supplied to the data input terminal of the AND gate 25 in this state, the AND gate 25 supplies the supplied time count data to average data store means 31 through an OR gate 30. The AND gate 24 is opened when the gate opening signal is supplied to the second input terminal of the AND gate 24, and when the passage detection termination signal is supplied to the first input terminal of the AND gate 24 in this state, the AND gate 24 supplies the supplied passage detection termination signal to the computing means 28. The AND gate 29 is opened when the gate opening signal is supplied to the control input terminal of the AND gate 29, and when average data (new predetermined data) described hereinafter are supplied to the data input terminal of the AND gate 29 from the computing means 28 in this state, the AND gate 29 supplies the supplied average data to the average data store means 31 through the OR gate. More specifically, when the first paper sheet of paper sheets charged in the paper sheet counting machine after depression of the start button is delivered to the delivery passage 4, the time count data (which are used as the first predetermined data) of this paper sheet being delivered are put in the average data store means 31, and every time the subsequent paper sheets charged in the paper sheet counting machine are delivered to the delivery passage 4, the average data generated from the computing means 28 are put in the average data store means 31. Like the above-mentioned comparative data store means 26, the average data store means 31 comprises a register or a data latch circuit. The average data store means 31 stores the time count data supplied from the OR gate 30 or the average data as the predetermined data until the subsequent time count data or average data are supplied, and the average data store means 31 supplies the stored predetermined data to the computing means 28 and comparing means 27. When the passage detection termination signal is supplied to the computing means 28 from the AND gate 24, the computing means 28 reads the time count data, put out by the comparative data store means 26 and the predetermined data (average data), put out by the average data store means 31, and adds the time count data and average data to each other, and the computing means 28 divides the obtained addition data by 2 and supplies the obtained new predetermined data to the data input terminal of the AND gate 29. Incidentally, every time the passage detection termination signal is supplied to the computing means 28 from the AND gate 24, the computing means repeats the above operation.

Deviation constant store means 32 includes a register or a digital switch supplying two kinds of stored (or set) allowable error data (deviation constant data) d1 and d2 to the comparing means 27. The comparing means 27 adds the predetermined data supplied from the average data store means 31 and the allowable error data d1 supplied from the deviation constant store means 32 to each other, and compares the obtained upper limit length data with the length data supplied from the comparable data store means 26. When the length data are larger than the upper limit length data, the comparing means 27 supplies an error stop signal to the main controller 20. Furthermore, the comparing means 27 subtracts the allowable error data d2 supplied from the deviation constant store means 32 from the predetermined data supplied from the average data store means 31 and compares the obtained lower limit length data with the length data supplied from the comparative data store means 26. When the length data are smaller than the lower limit length data, the comparing means 27 supplies an error stop signal to the main controller 20. Incidentally, every time new length data are supplied from the comparative data store means 26 or new predetermined data are supplied from the average data store means 31, the comparing means 27 repeats the above operation. When the error stop signal is supplied to the main controller 20 from the comparing means 27, the main controller 20 performs a predetermined error stop processing operation of, for example, putting out signals for stopping the respective members such as the guide roller 2, the delivery roller 3 and the like, supplying these signals to the respective members and supplying an error display signal to display means (not shown) to indicate occurrence of an error.

The circuit having the above-mentioned structure is operated in the same manner as described above with respect to the circuit shown in FIG. 2, and the length of paper sheets passing through the delivery passage 4 is judged and an abnormal flow of paper sheets is detected based on the result of the judgement.

In the foregoing embodiment, since the length data of the paper sheet which first passes through the delivery passage 4 are stored as the first predetermined data, if a chain of lapped paper sheets is first supplied into the delivery passage, the second normal paper sheet is judged as a broken paper sheet and the circuit performs the above-mentioned error stop processing. Therefore, even if a chain of lapped paper sheets first flows through the apparatus, high counting precision can be maintained.

Incidentally, in the foregoing embodiment, new predetermined data are obtained every time a paper sheet passes through the delivery passage 4. Of course, if new predetermined data are not substantially different from the preceding predetermined data, there may be adopted a modification in which new predetermined data are obtained every time n of paper sheets pass through the delivery passage. Furthermore, when new predetermined are obtained, averaging may be accomplished by giving weight to the preceding determined data (or the new determined data).

Figure 5:
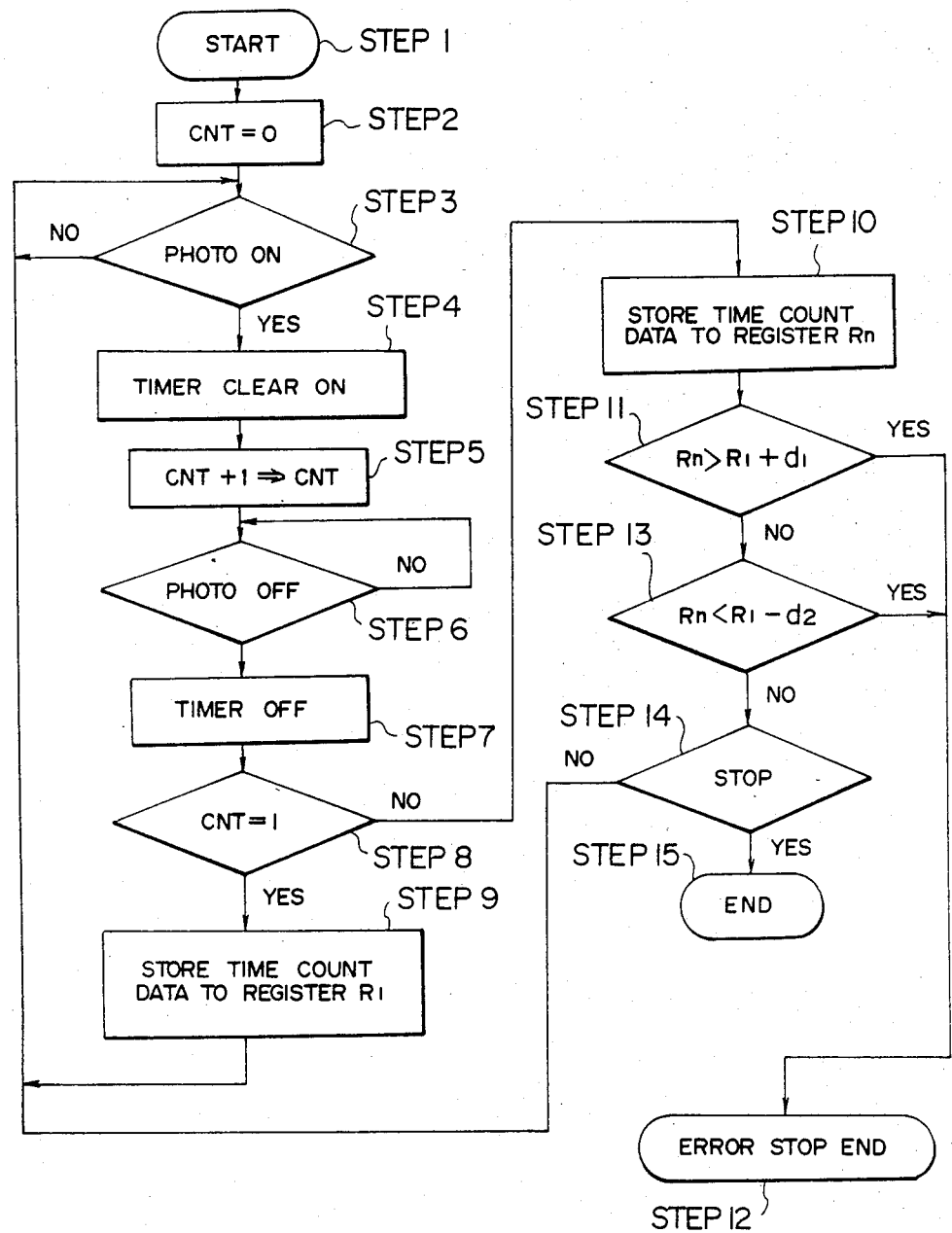
FIG. 5 is a block diagram showing a second embodiment according to the present invention in which the circuit is constructed by using a CPU system.

FIG. 5 shows a second embodiment according to the present invention. The second embodiment is constructed in a similar manner to the first embodiment except with respect to step 9 through step 16. Therefore, the following explanation of the second embodiment will be made with references to the modified step 9 through step 16.

When the data read out indicate "1" as a result of judgement in the step 8, the stored time count data are stored in a register of a predetermined address in RAM 12 (this register will be referred to as "$R_1$" hereinafter) by CPU 10 (step 9 in FIG. 5). When the subsequent paper sheet being delivered through the delivery passage 4 starts to pass between the light projector and receiver 5a and 5b and the level of the transmitted light quantity signal put out by the light receiver 5b is reduced, CPU 10 repeats the above-mentioned operations (steps 3 through 7 in FIG. 5). Then, CPU 10 reads out the count data stored in the count register and judges whether or not the count data thus read out indicate "1" (step 8 in FIG. 5). Since the count data read out do not indicate "1", the time count data from the timer 14, which are stored at this time (the data are used as the paper sheet length data), are stored in a register having a predetermined address (hereinafter referred to as "Rn") in RAM 12 by CPU 10 (step 10 in FIG. 5).

Then, CPU 10 reads the allowable error data d1 stored in RAM 12 and the reference length data stored in the register $R_1$ of RAM 12 and adds both the data, and CPU 10 stores the obtained upper limit length data. Then, CPU 10 reads the length data stored in the register Rn of RAM 12 and compares the read length data with the upper limit length data (step 11 in FIG. 5). In the case where the read length data are larger than the upper limit length data, that is, in the case where chained flow of lapped paper sheets is noted, a predetermined error stop processing operation occurs, for example, a signal for stopping the driving of the clutch, a signal for starting the driving of the brake and the like is sent to the output port 15 to stop the respective members, and simultaneously, an error display signal is supplied to the key board and display I/O port 13 to cause the display means to indicate occurrence of an error (step 12 in FIG. 5). In the above-mentioned case, if the read length data are equal to or smaller than the stored upper limit length data, CPU 10 reads the allowable error data d2 stored in RAM 12 and the reference length data stored in the register $R_1$ of RAM 12, subtracts the allowable error data d2 from the read reference length data and stores the obtained lower limit length data. Then, CPU 10 reads the length data stored in the register Rn of RAM 12 and compares the read length data with the stored lower limit length data (step 13 in FIG. 5). In the case where the read length data are smaller than the stored lower limit length data, namely if a broken paper piece (broken note) is detected, the above-mentioned predetermined error stop processing operation is performed (step 12 in FIG. 5). On the contrary, in the case where the read length data are equal to or larger than the stored lower limit length data, CPU 10 judges whether or not the key board and display I/O port 13 puts out a stop signal (step 14 in FIG. 5). In the case where the key board and display I/O port 13 puts out a stop signal, namely when the operator depresses the stop button of the input means 17, CPU 10 puts out signals to terminate the counting operation, for example, a signal for stopping the driving of the counting motor, a signal for stopping the driving of the collecting wheel motor and the like are sent to the output port to stop the respective members (step 15 in FIG. 5). On the contrary, when the key board and display I/O port 13 does not put out a stop signal, CPU 10 repeats the above-mentioned operations (steps 3 through 8 and 10 through 15 in FIG. 5). Incidentally, in the case where CPU 10 is standing by at the step 3, if the timer 14 puts out an interrupt signal, CPU 10 overrides the standing-by and begins the processing operation necessary to terminate of the counting operation.

In the foregoing embodiment, the allowable error data d1 and d2 are stored in RAM 12 in advance. Of course, there may be adopted a modification in which while paper sheets charged in the paper sheet counting machine, allowable errors of respective paper sheets are obtained, the obtained allowable errors are shown in the display means 18 during or after the counting operation and the operator inputs the shown allowable error data in RAM 12 or allowable error data in RAM 12 based on the maximum allowable error data or predetermined allowable error data. Moreover, these allowable error data may be stored in ROM 11 though these data are stored in RAM 12 in the foregoing embodiment.

In the foregoing embodiment, since the double detection circuit 19 is utilized with the present invention, the detection of double feeding can be performed simultaneously with the above-mentioned length detection, and therefore, the precision of the counting operation can be increased.

FIG. 6 is a block diagram showing the circuit structure of another embodiment of the second embodiment. Referring to FIG. 4, when the start button of the input means 17, mounted on the front panel of the paper sheet counting machine shown in FIG. 1, is depressed, a main controller 40, for controlling the respective members, generates a count start signal and supplies this signal to number count means 41. Paper sheet detecting means 42 comprises light projectors and receivers 5a and 5b shown in FIG. 1, and when a paper sheet being delivered through the delivery passage 4 begins to pass between the light projectors and receivers 5a and 5b, the paper sheet detecting means 42 supplies a passage detection starting signal to the number count means 41 and time count means 43. When the paper sheet being delivered through the delivery passage 4 has passed between the light projectors and receivers 5a and 5b in this state, the paper sheet detecting means 42 supplies a passage detection termination signal to the time count means 43. The time count means 43 includes a re-trigger type timer. When the passage detection starting signal is supplied to the time count means 43 from the paper sheet detecting means 42, this timer of the time count member 43 is reset to start the time counting operation, and when the passage detection termination signal is supplied to the time count means 43 from the paper sheet detecting means 42 in this state, the time counting operation is terminated and the time count means 43 supplies the obtained time count data to a data input terminal of an AND gate 44 and comparative data store means 45. Every time the passage detection starting signal is supplied from the paper sheet detecting means 42, the time count means 43 repeats the above-mentioned operation. The comparative data store means 45 comprises a register or a data latch circuit, and the comparative data store means 26 stores the time count data supplied from the time count means 43 until the subsequent time count data are supplied. Simultaneously, the comparative data store means 45 supplies the stored time count data to comparing means 46.

The number count means 41 comprises a counter and is actuated when a number count starting signal is supplied from the main controller 40. The number count means 41 counts the number of passage detection starting signals supplied from the paper sheet detecting means 42 and supplies the obtained number count data to display means (not shown). When the number count data indicate "1", the number count means 41 supplies a gate opening signal to a control input terminal of the AND gate 44. When the gate opening signal is supplied to the control input terminal of the AND gate 44, the AND gate 44 is turned on to supply the time count data, supplied at the data input terminal of the AND gate 44, to the reference data store means 47. That is, after the start button is depressed, the time count data (this time count data becomes the reference length data) for first paper sheet, conveyed through the passage 4, is put in the reference data store means 47. Like the above-mentioned comparative data store means 45, the reference data store means 47 comprises a register or data latch circuit. The reference data store means 47 stores the reference length data supplied from the AND gate 44 until the subsequent reference length data are supplied. The reference data store means 47 supplies the stored reference length data to the comparing means 46.

Deviation constant store means 48 comprising a register or a digital switch supplies two kinds of stored (or set) allowable error data (deviation constant data) d1 and d2 to the comparing means 46. The comparing means 46 adds the reference length data, supplied from the reference data store means 47, and the allowable error data d1, supplied from the deviation constant store means 48, to each other, and compares the obtained upper limit length data with the length data supplied from the comparable data store means 45. When the length data are larger than the upper limit length data, the comparing means 46 supplies an error stop signal to the main controller 40. Furthermore, the comparing means 46 subtracts the allowable error data d2, supplied from the deviation constant store means 48, from the reference length data, supplied from the reference data store means 47, and compares the obtained lower limit length data with the length data supplied from the comparative data store means 45. When the length data are smaller than the lower limit length data, the comparing means 46 supplies an error stop signal to the main controller 40. Incidentally, every time new length data are supplied from the comparative data store means 45, the comparing means 46 repeats the above operation. When the error stop signal is supplied to the main controller 40 from the comparing means 46, the main controller 40 performs a predetermined error stop processing operation, such as putting out signals for stopping the respective members such as the guide roller 2, the delivery roller 3 and the like, supplying these signals to the respective members and supplying an error display signal to display means (not shown) to indicate occurrence of an error.

The circuit having the above-mentioned structure is operated in the same manner as described above with respect to the circuit shown in FIG. 5, and the length of paper sheets passing through the delivery passage 4 is judged and an abnormal flow of paper sheets is detected based on the result of the judgement.

In the foregoing embodiment, since the length data of the paper sheet which first passes through the delivery passage 4 are stored as the first predetermined data, if a chain of lapped paper sheets is first supplied into the delivery passage, the second normal paper sheet is judged as a broken paper sheet and the circuit performs the above-mentioned error stop processing operation. Therefore, even if a chain of lapped paper sheets first flows through the device, high counting precision can be maintained.

As will be apparent from the foregoing description, according to the present invention, there are disposed length detecting means for detecting the length of a paper sheet when it passes through a predetermined position of a paper sheet passage to issue respective length signals for each passing sheet, memory means for storing predetermined data obtained based on the length data obtained by said length detecting means, computing means for obtaining new predetermined data based on the predetermined data obtained by said memory means and the length data obtained by said length detecting means when the next paper sheet passes through said predetermined position and making the so-obtained new data stored in said memory means as the predetermined data, and judging means for determining whether or not the paper sheet, the length of which is detected by said length detecting means, has been normally drawn out, based on the predetermined data stored in said memory means and the data obtained by said length detecting means every time the paper sheet passes through said predetermined position, and an abnormal flow of paper sheets is detected based on the result of discrimination made by said judging means. Accordingly, even if the kind of paper sheets to be thrown into the paper sheet counting machine is changed, reference length data corresponding to the new kind of paper sheets can be automatically be set, whereby operations to be done by an operator can be simplified and reduced and the number and occurrence of troubles due to erroneous inputs can be prevented. Furthermore, measurement of the length of paper sheets can be omitted, and even if the paper sheet delivery speed is changed by variations of the load and the like, reference length data corresponding to the changed delivery speed can automatically be set. Therefore, even if the load is changed, an erroneous operation can be prevented.

What is claimed is:

1. A circuit for detecting abnormal flows in a paper sheet counting machine wherein sheets of paper which are temporarily stacked in an inlet section are drawn out through a paper sheet passage, one at a time, and are counted, which comprises;

length detecting means for detecting the length of each paper sheet when said each paper sheet passes through a predetermined position of said paper sheet passage and issuing a respective length signal for the passage of said each paper sheet;

memory means operatively connected to said length detecting means for storing length data obtained from each length signal;

computing means operatively connected to said memory means for calculating average data of lengths of paper sheets from length data stored in said memory means, said average length data being stored in said memory means;

renewal means operatively connected to said memory means and said computing means for renewing said average length data stored in said memory means by providing the newest length data from said memory means to said computing means corresponding to the passage of said each paper sheet;

comparing means operatively connected to said memory means for comparing said newest length data and said average length data to generate a difference signal representative of the difference between said newest length data and said average length data; and judging means operatively connected to said comparing means for determining whether an abnormal flow of the paper sheets occurs, in response to said difference signal from said comparing means.

2. A circuit according to claim 1 wherein said judging means judges whether said difference signal exceeds an upper limit value and whether said difference signal is below a lower limit value.

3. A circuit according to claim 1 wherein said average length data is obtained by said computing means by averaging two length data.

4. A circuit according to claim 1 wherein said average length data is obtained by said computing means by averaging more than two length data together.

5. A circuit for detecting abnormal flows in a paper sheet counting machine wherein sheets of paper which are temporarily stacked in an inlet section are drawn out through a paper sheet passage, one at a time, and are counted, which comprises:

a paper sheet detection means for detecting the passage of each paper sheet through a predetermined position in said paper sheet passage to issue a passage signal;

a time count means operatively connected to said paper sheet detection means for counting the time periods during said passage of said each paper sheet in response to said passage signal from said paper sheet detection means and to generate a length signal respresentative of the length of each paper sheet;

a comparative data store means operatively connected to said time count means for storing the newest length signal as length data;

computing means operatively connected to said comparative data store means for calculating average data of lengths of paper sheets from said length signals supplied from said time count means through said comparative data store means;

average data store means operatively connected to said computing means for storing said averaging data of said computing means; and comparing means operatively connected to said comparative data store means and said average data store means for comparing the newest length data from said comparative data store means and said average data to generate a difference signal, whereby an abnormal flow in the paper sheet counting machine is judged in response to the difference signal.

6. A circuit according to claim 5, further comprising deviation constant store means operatively connected to said comparing means for providing error data to determine upper and lower limits for the difference signal.

7. A circuit according to claim 5, further comprising number count means operatively connected to said paper sheet detection means for counting the number of paper sheets in response to the passage signal from the paper sheet detection means.

* * * * *